United States Patent
Murdock et al.

(10) Patent No.: US 8,171,043 B2
(45) Date of Patent: May 1, 2012

(54) METHODS FOR IMPROVING THE DIVERSITY OF IMAGE SEARCH RESULTS

(75) Inventors: Vanessa Murdock, Barcelona Catalunya (ES); Roelof Van Zwol, Badalona Catalunya (ES); Lluis Garcia Pueyo, Sant Cugat del Vallas Barcelona (ES); Georgina Ramirez Camps, Barcelona Catalunya (ES)

(73) Assignee: Yahoo! Inc., Sunnyvale, CA (US)

( * ) Notice: Subject to any disclaimer, the term of this patent is extended or adjusted under 35 U.S.C. 154(b) by 465 days.

(21) Appl. No.: 12/257,991

(22) Filed: Oct. 24, 2008

(65) Prior Publication Data

US 2010/0114933 A1  May 6, 2010

(51) Int. Cl.
*G06F 17/30* (2006.01)
(52) U.S. Cl. .......................... 707/767; 707/748; 707/750
(58) Field of Classification Search .................. 707/748, 707/750, 759, 765, 767
See application file for complete search history.

(56) References Cited

U.S. PATENT DOCUMENTS

| | | | | |
|---|---|---|---|---|
| 7,725,451 | B2 * | 5/2010 | Jing et al. ...................... | 707/707 |
| 2006/0010126 | A1 * | 1/2006 | Anick et al. ...................... | 707/4 |
| 2009/0074306 | A1 * | 3/2009 | Liu et al. ...................... | 382/229 |
| 2009/0076800 | A1 * | 3/2009 | Li et al. ........................... | 704/10 |
| 2009/0313239 | A1 * | 12/2009 | Wen et al. ......................... | 707/5 |
| 2009/0319513 | A1 * | 12/2009 | Terao et al. ...................... | 707/5 |

OTHER PUBLICATIONS

Lavrenko, Victor, et al., "Cross-Lingual Relevance Models", Center for Intelligent Information Retrieval, ACM, 2002, 8 pages.

Lew, Michael S., et al., "Content-based Multimedia Information Retrieval: State of the Art and Challenges", In ACM Transactions on Multimedia Computing, Communications, and applications, Feb. 2006, 26 pages.

Soboroff, Ian, et al., "Overview of the TREC 2003 Novelty Track", National Institute of Standards and Technology, 2003, 16 pages.

(Continued)

*Primary Examiner* — Khanh Pham
(74) *Attorney, Agent, or Firm* — Hickman Palermo Truong & Becker LLP (57) ABSTRACT

Techniques are described to increase the diversity or focus of image search results. A user submits an original query to search for images. A server generates a first results set by executing the original query using metadata associated with each image. The server selects, from the first results set, a specified number of results ranked highest and generates a list of terms from the metadata of each of the results selected. The terms may be only the tags of the results. The server generates an updated query using terms in the list that may be weighted based on the frequency of the term in the list or include only a specified number of the highest occurring terms in the list. The server generates a second results set by executing the updated query using metadata associated with each image. The second results set is then stored and displayed to the user.

16 Claims, 3 Drawing Sheets

OTHER PUBLICATIONS

Soboroff, "Overview of the TREC 2004 Novelty Track", National Institute of Standards and Technology, 2004, 16 pages.

Datta, Ritendra, et al., "Image Retrieval: Ideas, Influences, and Trends of the New Age", ACM Computing Surveys, vol. 40, No. 2, Article 5, Apr. 2008, 60 pages.

Diaz, Fernando, et al., "Improving the Estimation of Relevance Models Using Large External Corpora", Center for Intelligent Information Retrieval, ACM, 2006, 8 pages.

Harman, Donna, "Overview of the TREC 2002 Novelty Track", National Institute of Standards and Technology, 2002, 11 pages.

Jeon, J, et al., "Automatic Image Annotation and Retrieval using Cross-Media Relevance Models", Center for Intelligent Information Retrieval, ACM 2003, 8 pages.

Kherfi, M.L., et al., "Image Retrieval from the World Wide Web: Issues, Techniques, and Systems", ACM Computing Surveys, vol. 36, No. 1, Mar. 2004, 33 pages.

Lavrenko, V., et al., "A Model for Learning the Semantics of Pictures", Center for Intelligent Information Retrieval, 2003, 8 pages.

Lavrenko, Victor, et al., "Relevance-Based Language Models", Center for Intelligent Information Retrieval, ACM 2001, 8 pages.

Marlow, Cameron, et al., "HT06, Tagging Paper, Taxonomy, Flickr, Academic Article, ToRead", Hypertext 2006: Proceedings of the Seventeenth Conference on Hypertext and Hypermedia, ACM Press 2006, 9 pages.

Murdock, Vanessa, "Aspects of Sentence Retrieval", PhD Thesis, University of Massachusetts, 2006, 171 pages.

Murdock, Vanessa, et al., "A Translation Model for Sentence Retrieval", Proceedings of Human Language Technology Conference and Conference on Empirical Methods in Natural Language, Association for Computational Linguistics, Oct. 2005, 8 pages.

Ponte, Jay M., et al., "A Language Modeling Approach to Information Retrieval", In Proceedings of the $21^{st}$ Annual Conference on Research and Development in Information Retrieval, ACM SIGIR, 1998, 7 pages.

Sigurbjornsson, Borkur, et al., "Flickr Tag Recommendation based on Collective Knowledge", In Proceedings of the $17^{th}$ International World Wide Web Conference (WWW2008), Apr. 2008, 10 pages.

Song, Kai, et al., "Diversifying the Image Retrieval Results", ACM, In Multimedia 2006: Proceedings of the $14^{th}$ Annual ACM International Conference on Multimedia, 2006, 4 pages.

Vee, Erik, et al., "Efficient Computation of Diverse Query Results", In Proceedings of VLDB, 2007, 10 pages.

Zhang, Benyu, et al., "Improving Web Search Results Using Affinity Graph", ACM, In SIGIR 2005: Proceedings of the $28^{th}$ Annual International ACM SIGIR conference on Research and development in Information retrieval, 2005, 8 pages.

Ziegler, Cai-Nicolas, et al., "Improving Recommendation Lists Through Topic Diversification", ACM, In WWW 2005: Proceedings of the $14^{th}$ international conference on World Wide Web, 2005, 11 pages.

Allan, J., et al., "The Lemur Toolkit for Language Modeling and Information Retrieval", 2005. Open source software toolkit, latest version available at: http://www.lemurproject.org.

* cited by examiner

FIG. 1

(prior art)

FIG. 3 ion, the results are based upon the ranking of the original query, but additional searches are performed for extracted senses of the query. Diversity may be introduced on result re-ranking through clustering of the top results or by employing probabilistic approaches. However, these techniques may harm the precision of the search results because they rely on the quality of the keyword-based retrieval performed initially. Additionally, precision may be hurt with the introduction of synonyms that are low quality.

METHODS FOR IMPROVING THE DIVERSITY OF IMAGE SEARCH RESULTS

FIELD OF THE INVENTION

The present invention relates to image searching.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Search engines help a user to locate information. Using a search engine, a user may enter one or more search query terms and obtain a list of resources that contain or are associated with subject matter that matches those search query terms. To find the most relevant files, search engines typically attempt to select, from among a plurality of files, files that include many or all of the words that a user entered into a search request. This works well when the files searched contain a large quantity of text where relevance and context may be determined. Images, however, present problems because often the only way to determine the content and context of an image is through small snippets of text associated with the image.

As photo sharing services on the Internet have become more popular, obtaining more effective search results of those images has become increasingly important. Photo sharing services allow users to upload and share digital images with family, friends, and the general public.

Users may be given the opportunity to provide annotations to each particular photo uploaded. These annotations, which may also be referred to as user-generated content, may define a title, description, and a set of tags for the photo. The set of tags might contain keywords to indicate the subject matter of the image. The photo annotations provided are essential to making the photos retrievable by text-based retrieval models and allow users to formulate keyword-based queries against the photo collection.

Due to the rich nature of the image content, and the limited expressiveness of keyword-based query formulation, it is often difficult for a user to precisely formulate his information request. One reason for this difficulty is that there is often little data associated with images. For example, an image might have data that is annotated by a user about the image. This might include the title, a description, and tags regarding the image. However, many more images lack even this rudimentary data. The data may also be noisy, meaning that the data is not relevant to the subject of the image. For example, a user might bulk upload hundreds of photos at the same time and annotate all of the photos with the same tag, without regard to content.

Figure 1:
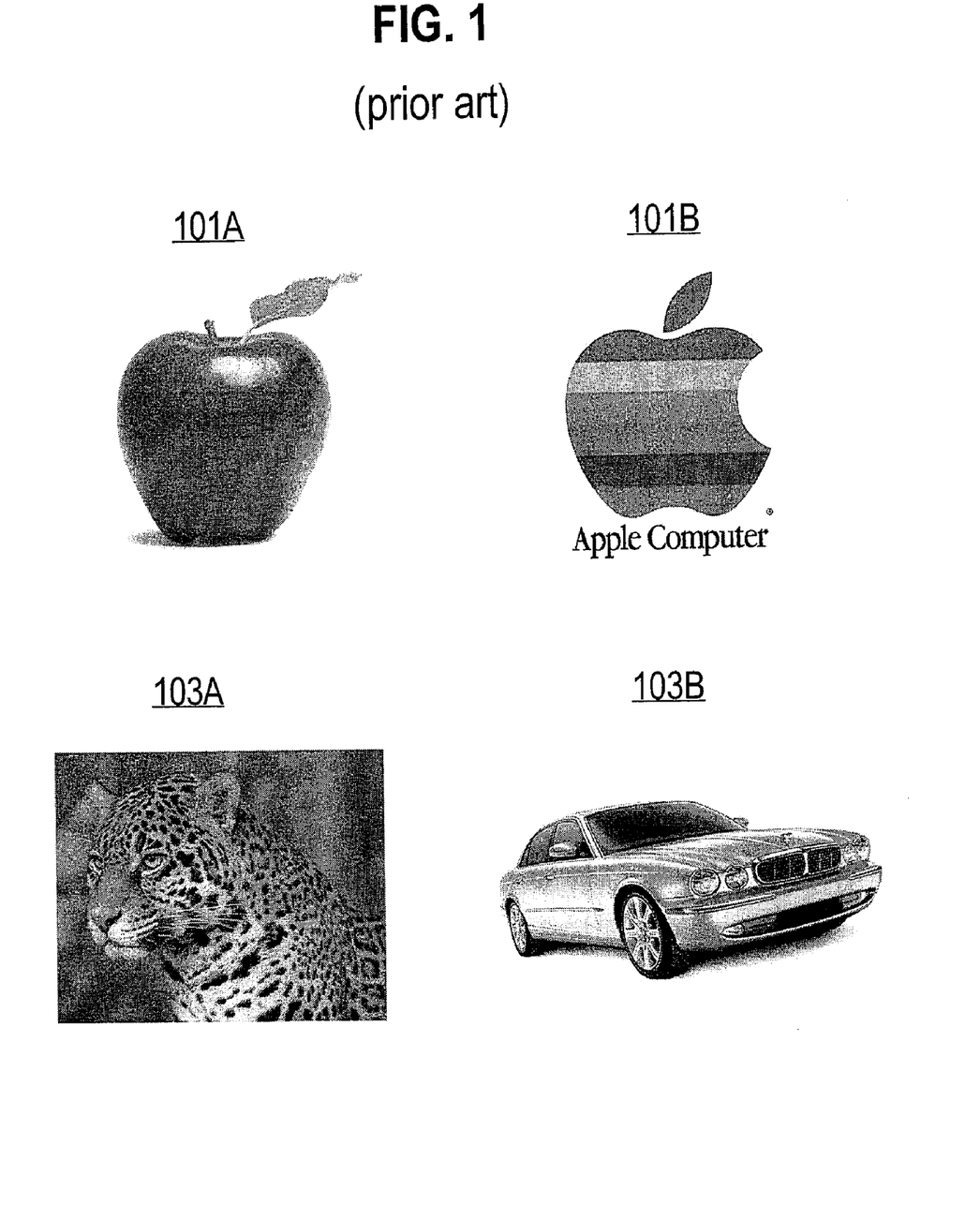
FIG. 1 is a diagram displaying examples of word sense ambiguity that may be present in image search results.

In addition, users often employ words in a query that may present ambiguities. Examples of word ambiguities are shown in FIG. 1. For example, a user might enter the query word "apple." In response, the search engine might return image 101A and 101B. Image 101A shows "apple" as a fruit. Image 101B displays "apple" as a computer company logo. Unfortunately, based upon only the query word, it is not possible to determine whether the user's intent is to find results relating to the fruit or the company logo. This type of ambiguity is referred to herein as word-sense ambiguity. In word-sense ambiguity, the dominant topic that the word may relate to is the primary sense, and a secondary topic of the word is a secondary sense. For the query "apple," the primary sense might be "corporate logo," and the secondary sense might be "fruit."

In another example, a user might enter the query word "jaguar." In response, the search engine might return image 103A and image 103B. Image 103A shows "jaguar" as an animal. Image 103B displays "jaguar" as an image of a car from the automotive manufacturer, Jaguar. The intent of the user also may not be determined based upon the query word "jaguar" without determining more detailed context.

Different ambiguities may occur as well. A determination might be made that the user intended to find images for "apple" that are related to the computer company. Under this circumstance, the images sought may refer to any one of the computer company's products, logos, or events. In this case, the ambiguity is referred to as type-specific ambiguity.

Due to the rich nature of the image content, and the limited expressiveness of keyword-based query formulation, it is often difficult for a user to precisely formulate his information need. In the absence of disambiguating information, the user should be presented with a diverse set of images that embodies many possible interpretations of the user's query. When presented with results reflecting multiple senses of the query, the likelihood that the user's intention will be represented are greatly increased. While traditional information retrieval models focus on finding the most relevant document without consideration for diversity, effective image search requires results that are both diverse and relevant. Thus, methods that provide image search results that are both relevant and diverse are highly desirable.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described to return image search results that are both diverse and relevant, or on the contrary, highly focused and relevant. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Different methods may be employed to improve the diversity of image search. The goal is a method that does not harm precision for unambiguous queries while respecting the topical diversity of ambiguous queries. Methods may integrate the diversity of the search results directly into the retrieval strategy or be post-processes. Examples of post-processing are query expansion and results re-ranking. In query expansion, a user's original query is expanded to include additional words, such as synonyms or different morphological forms of a word, so that the search query matches additional documents. In results re-ranking, results are re-ranked to enrich topic coverage in retrieval results.

Different types of language modeling for retrieval may also be employed. Examples of language modeling are query likelihood and relevance models. Query likelihood estimates the probability that a document was generated from the same distribution as the query. As used herein, a document is metadata associated with an image. Relevance models estimate a model of the query from the distribution of relevant documents in the collection. A collection is the corpus of documents from which results are obtained. Relevance models effectively add terms to the query that are related to the relevant documents. For a query that is topically unambiguous, the effect is to encourage relevant documents to be ranked higher. For topically ambiguous queries, terms related to multiple senses of the query are included in the query model, and therefore the resulting documents are more topically diverse.

Methods that return image search results that are both diverse and relevant are described herein. These methods are integrated directly into the retrieval strategy. A user initiates an image search request by submitting a query to a server that performs the search. The query comprises one or more keywords and may or may not contain ambiguous terms. The server generates a first results set by executing the original query relative to metadata associated with each image in an image corpus. In another embodiment, the original query is executed relative to only tags associated with each image in the image corpus. The server selects, from the first results set, a specified number of results that are ranked the highest. The server generates a list of terms that are derived from the metadata from each of the selected results. In an embodiment, the terms are limited to only tags from each of the selected results. The server then generates an updated query using terms from the generated list. In an embodiment, all terms in the list are included in the updated query, and each term in the updated query is weighted based upon the frequency of the occurrence of the term in the list. In another embodiment, the updated query is restricted to a specified number of terms. The terms are ranked based upon the frequency of the term in the list. The terms placed in the updated query are the specified number of highest ranked terms. Based upon the updated query, a search is performed relative to the metadata of the images to generate a second results set. The second results set is stored on a computer-readable storage medium, and then at least a subset of the second results set may be displayed to the user.

Receiving a Query and Generating a First Results Set

When a user wishes to search for an image, he may enter one or more keywords with the intent to find images that are related to or embody concepts represented by the one or more keywords. The query is often not written in natural language, such as in the form of a question. On occasion, one or more of the keywords in the query may present ambiguities. Examples of words with word-sense ambiguities are "apple," "jaguar," and "shark." "Apple" may refer to an image of the computer company logo or a fruit. For "jaguar," the user might be searching for an image of the automobile or an animal. For "sharks," the user might be searching for an image of a type of fish or the logo of an NHL hockey team. It is simply not possible to determine the user's intent without further inquiry. Generating a diverse results set solves this quandary by presenting results that correspond to various different intents.

Once the query request is received from the user, a server executes the search query request based upon metadata of the images. As used herein, "metadata" is data that describes another set of data. Metadata may refer to user-generated content, such as title, description, and tags. A title is a descriptive heading or caption for the image and is usually about three terms long. A description is a short statement that describes the image. The description is often written in natural language. Tags are keywords that may indicate or refer to any aspect of the image.

Tags associated with an image resemble a query in character, in that a tag set contains content terms not written in the sentence structure of a natural language. Tags are succinct, and users often tag photos with sets of synonyms and related terms. A user may add tags to an image upon uploading to a photo-sharing website. Other users may also add tags to particular images. For example, a user browsing a photo sharing website might particularly enjoy an image and wish to tag the image with a unique keyword so that he and others can later find the image using the keyword. Tags are not limited to synonyms or related terms, but may also refer to the genre or any aspect of the image. For example, an image of an old barn might elicit such wide ranging tags as: "barn," "old," "rural," "autumn" (the season the image was taken), "nikon" (the type of the camera used), "blackandwhite" (indicating a black & white image), and "texas" (the site of the barn).

Tags may be added and rated by other users as well to provide better context. For example, an image might have a set of seven tags, but one tag might simply be the name of the camera, like "nikon." Under this circumstance, a user browsing the image might feel that "nikon" does not reflect the content or subject matter of the image. Tags with higher ratings would be given greater importance than tags with lower ratings. Additionally, a tag that has been associated with a particular image by many different users may be given greater weight, relative to the particular image, than that given to a tag that has been associated with that image by only a few users.

Metadata may also include data that is automatically generated. For example, in the context of images, metadata might include the date the image was taken and details of the camera settings (lens, focal length, aperture). Data about the data file of the image may also be stored. Such data may include, but is not limited to, the size of the file, the type of file, and the date the file was created or modified.

The query may be executed based upon different combinations of the metadata. In an embodiment, the query is executed based upon all metadata of images (including tags). In another embodiment, the query is executed based only on tags associated with images. In other embodiments, the query is executed based on only user-generated metadata (rather than automatically generated metadata).

Generating a List of Terms from the First Results Set

The server's execution of the query returns a first results set of images that are ranked based upon the relevance of the results to the query. In an embodiment, the server selects, from the first results set, a specified number of results that are ranked the highest. The specified number of results may be determined in numerous ways. In an embodiment, the specified number is a fixed number. The fixed number may be provided by an administrator and adjusted at any time. The number of results may be adjusted based upon results of previous searches. In another embodiment, the specified number may be based upon the total number of results in the first results set. For example, the specified number might vary based upon the number of results returned for a query. If up to 250 results are received, then 30 results may be selected. If 250 to 500 results are received, then 60 results may be selected. If more than 500 results are received, then 100 results may be selected. Under these circumstances, if a search yields 200 results in a result set, then the top 30 results would be selected.

In another embodiment, the specified number may also be determined based upon a percentage of the results in the first results set. The percentage may vary and may be specified by an administrator. For example, the administrator might determine that the top 10% of results from the search result set should be selected. Based upon these circumstances, if a search query yields a results set with 300 results, then the top 30 results would be selected. In yet another embodiment, the specified number is determined by the relevance score of a result. A relevance score is based on a calculation of how important the result is to the query. If a relevance score is determined to be above a particular threshold, then the result is selected. The selection process may vary based upon the implementation and may include hybrids of methods. For example, for up to 250 results in the first results set, 30 results may be selected, but for greater than 250 results in the first results set, a percentage of the results may be selected. In an embodiment, the number of results selected is less than the number of results in the first results set. In another embodiment, the number of results selected is equal to the number of results in the first results set.

In an embodiment, the server generates a list of terms that are derived from the metadata from each of the selected results (and only the selected results). Metadata for images may vary and include both user-generated content and content that is automatically generated. The server may request the metadata for each of the selected results. Once the metadata is collected, each term in the metadata is placed in a list. In an embodiment, all of the data in the metadata is used to generate the list of terms. In another embodiment, only a subset of the metadata is used the generate the list of terms. In yet another embodiment, the list is generated using only tags from each of the selected results. In another embodiment, only user-generated content in metadata is used to generate the list of terms.

The list contains many terms, and many of the terms in the list may be duplicated. To show the frequency of duplicate terms in the list, a histogram may be used. As used herein, a histogram is a graphical display of tabulated frequencies for each term in the list. The contents of the list is then used to generate a updated query.

Generating an Updated Query from the List

An updated query is then generated from the contents of the list. By including these additional terms in the updated query and executing the updated query, the server derives a more diverse result set than the first results set, which was based upon only the original query. In an embodiment, all terms that comprise the list are used in the updated query. When all terms are included, the terms within the updated query are weighted. The terms may be weighted based upon the frequency of a particular term in the list. For example, the list might have a total of ten terms with four terms in the stated frequencies for the original query "beetle": "insect" (5 times) "car" (3 times) "band" (1 time) "comic" (1 time). Each term is weighted by dividing the frequency of the term in the list by the total number of terms in the list. Thus, for the term "insect," the weighting is calculated as 5/10=0.5. Under these circumstances, the updated query would appear: insect (0.5), car (0.3), band (0.1), comic (0.1). Terms that appear more frequently in the list are given a greater weighting, and more importance and influence, in the query. In the case where only tags are used to generate the list, then ratings of the tags and/or the number of users that submitted those tags may also be taken into account when calculating weightings.

In an embodiment, the updated query may be generated by taking a specified number of the most frequently occurring terms from the list. In an embodiment, the number may be specified by an administrator and is a set number regardless of the number of unique terms in the list. In another embodiment, the specified number is determined by a percentage of the number of unique terms in the list.

In an embodiment, the updated query may be generated by taking terms from the list that occur at a frequency ratio that is above a threshold ratio. A frequency ratio is determined for each term in the list. Frequency ratio of a particular term is calculated by dividing the number of occurrences of the particular term by the total number of terms in the list. For example, if the term "apple" appeared 50 times in the list, and there were a total of 300 terms (where each duplicate term is counted separately) in the list, then the frequency ration of "apple" would be 20/300=0.167. An administrator might specify that a threshold of a frequency ratio of 0.15 must be satisfied for a term to be included in the updated query. Thus, each term with a frequency ratio equal to or greater than 0.15 would be included in the updated query.

When the updated query is generated, the original query terms may or may not be present in the updated query. In an embodiment, the original query keywords are included in the updated query. For example, in such an embodiment, if a user enters the original search query "apple", then "apple" would also always appear in the updated query generated. The original query keyword may be assigned a specified weighting to be used in the updated query. This weighting may be greater than the weighting of any other term in the updated query, or may be a weighting lower than the weighting of any other term in the updated query. In another embodiment, all original query keywords are excluded from the updated query. In yet another embodiment, original query terms only appear in the updated query if the original query term appears sufficiently frequent in the list.

Generating the Second Results Set from the Updated Query

The server generates a second results set by executing the updated query. The results set produced by executing the updated query is ranked by relevance. In an embodiment, the updated query is executed relative to all of the metadata of the images in the image corpus (which may include images not in the first results set). In another embodiment, the updated query is executed relative to only the tags of images in the image corpus. In yet another embodiment, the updated query is executed relative only to metadata that is user-generated for the images in the image corpus.

The second results set may be stored on volatile or non-volatile computer readable storage medium. At least a portion of the second results set (comprising a relevance-ranked set of images with related metadata) may then be displayed to the user as the results of the original query, since the first results set is never shown to the user.

Achieving Desired Image Search Results

Using the retrieval methods detailed above, the unit of retrieval to which the queries are executed may be varied to achieve a desired result in image search. The desired result may be increased diversity of the image search results set or more precision of the image result set. Particular results may provide a more diverse image search result based upon the unit of retrieval, and other particular results may provide a more focused image search result if a different unit of retrieval is used. The unit of retrieval may also vary (dual index approach) where the original query uses a particular unit of retrieval and the updated query uses a different particular unit of retrieval. In an embodiment, results are generated where the unit of retrieval is restricted to the tags of the metadata of the images in the image corpus. In an embodiment, this may be used with any type of language model employed. For example, the original query and updated query might be executed relative to the only the tags of the metadata of images. The contents of the list may also be restricted to only tags of the metadata.

In an embodiment, a dual index system is employed. In a dual index system, the original query is executed relative to only tags in the metadata of the images in the image corpus and the updated query is executed relative to all metadata of the images in the image corpus. In another embodiment of the dual index system, the original query is executed relative to all metadata of the images in the image corpus and the updated query is executed relative to only tags of the metadata of the images in the image corpus. The contents of the list may be restricted to only tags of the metadata or encompass all metadata of the images.

Illustrated Steps

Figure 2:
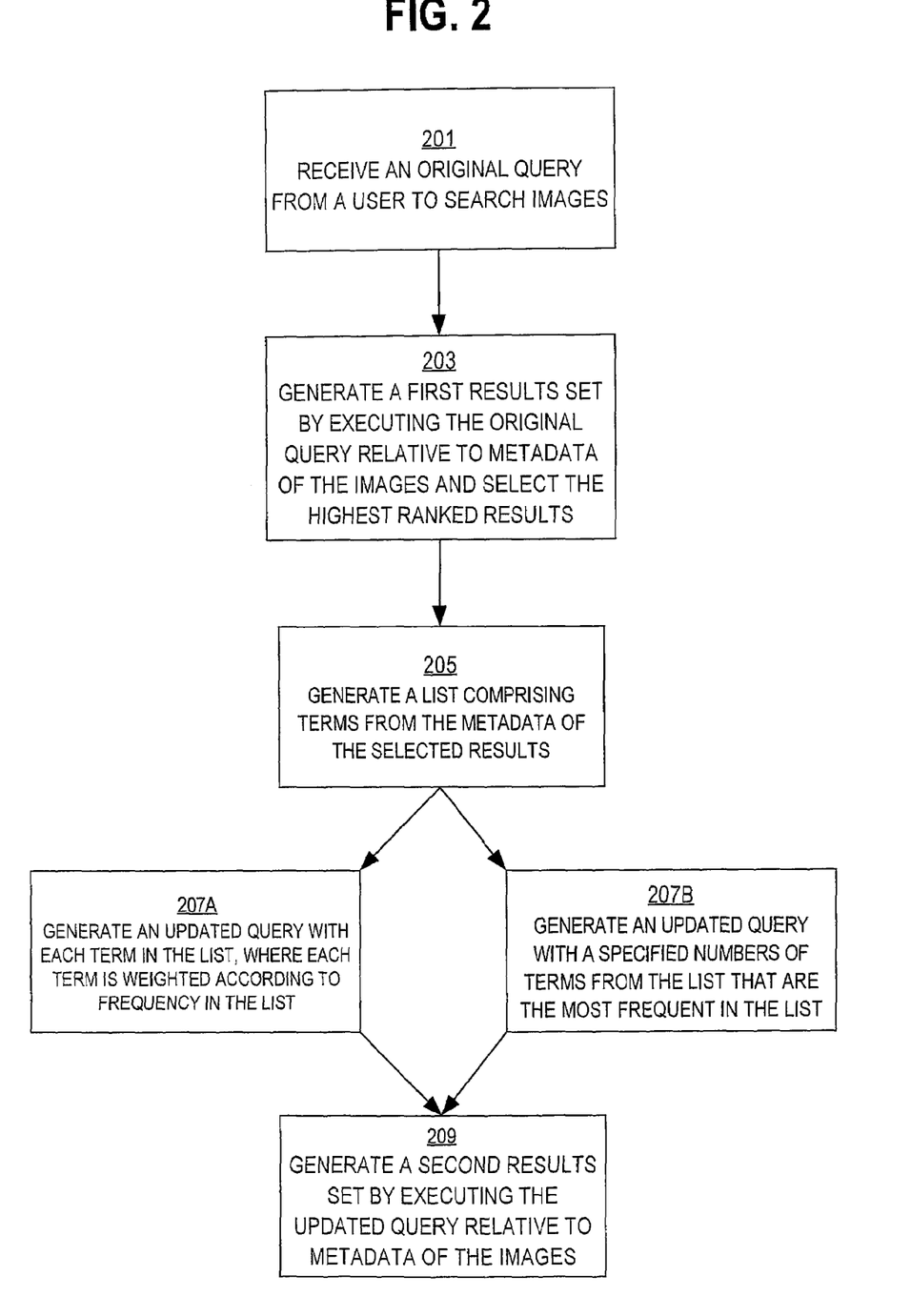
FIG. 2 is a diagram displaying the steps of techniques for generating a diverse and relevant image results set, according to embodiments of the invention.

FIG. 2 is a diagram displaying steps of techniques for generating a diverse and relevant image results set. In step 201, a user submits an original query that is received by a server to search for images. In step 203, the server generates a first result set by executing the original query. The query is executed relative to the metadata of images in an image corpus. In other embodiments, the query may be executed relative to only tags of those images. Once the first result set is received, the server selects a specified number of the highest ranked results. In step 205, the server generates a list that comprises the terms from the metadata of each of the selected results. Once the list is generated, then one of two steps may occur, as illustrated in alternative steps 207A and 207B. In step 207A, the server generates an updated query that includes one instance of each term that is in the list. Under step 207A, each term in the updated query is weighted based upon the frequency of the particular term in the list. Alternatively, in step 207B, an updated query is generated that only includes a specified number of terms that appear most frequently in the list. In other embodiments, the terms in the updated query of 207B may also be weighted. Regardless of whether step 207A or 207B is performed, control then passes to step 209. In step 209, the server generates a second results set by executing the updated query relative to the metadata of the images in the image corpus (which may include images that were not in the first results set). In other embodiments, the query may be executed relative to only the tags of images. The second results set is stored and at least a portion of the second results set is displayed to the user as the results of the original query. Consequently, a more diverse set of images, representing multiple different possible meanings of ambiguous query terms in the original query, is provided to the user.

Hardware Overview

Figure 3:
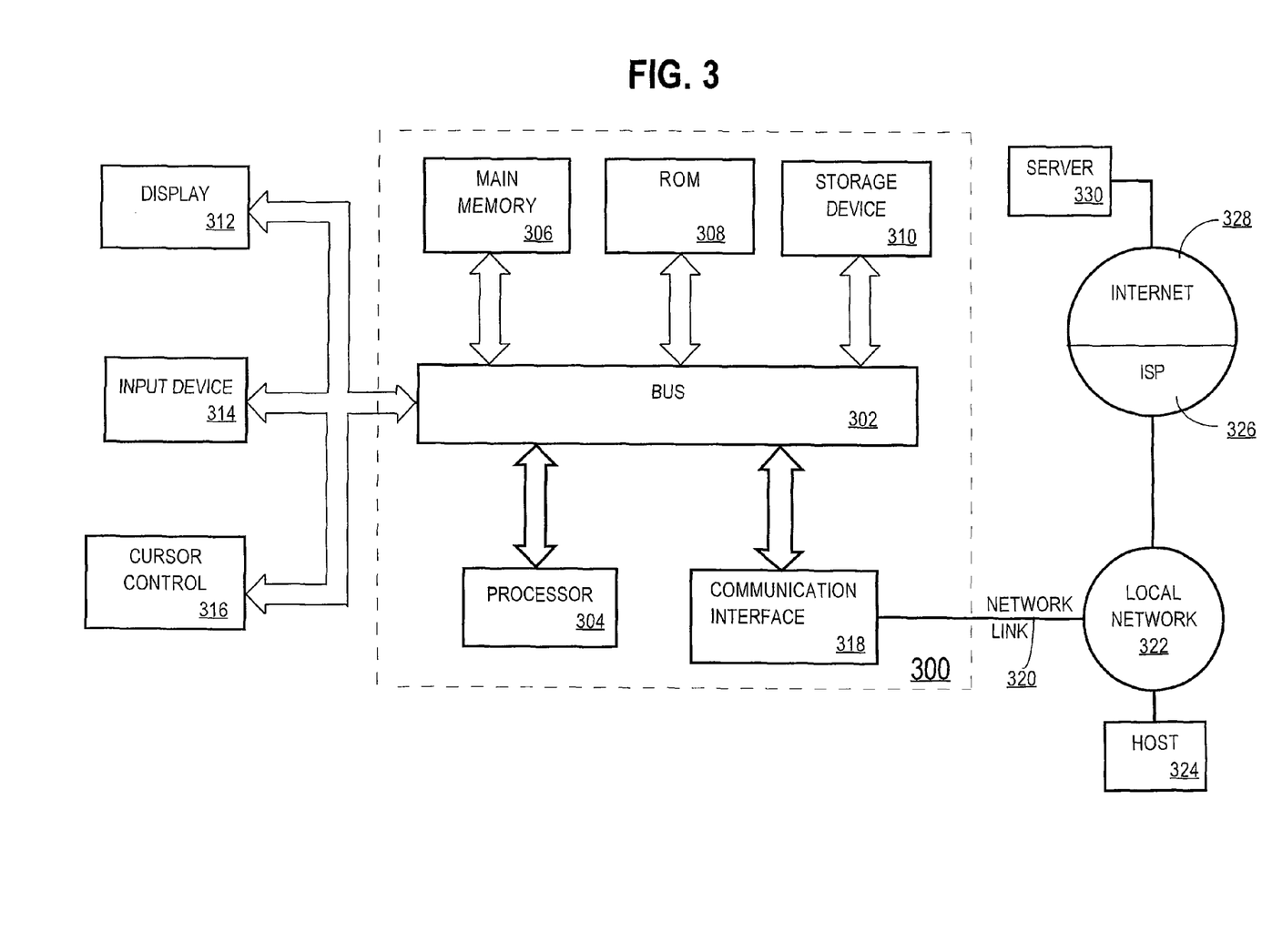
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method to generate a results set of images, comprising:
   receiving an original query from a user to search a plurality of images, each of which is associated with metadata;
   generating a first results set based on executing the original query relative to tags from the metadata associated with each image in said plurality of images;
   selecting, from the first results set, a specified number of results ranked highest in the first results set;
   generating a list comprising terms from tags from the metadata associated with each result of the specified number of results;
   for each term in the list, calculating a weight for that term based on a frequency of occurrence of that term in the list;
   generating a single updated query comprising terms that are in the list and that are weighted based on said weights;
   generating a second results set by executing only the updated query relative to metadata associated with each image in said plurality of images;
   storing the second results set on a non-volatile or volatile computer readable storage medium; and
   displaying, as a result of the original query, only images that are associated with metadata containing terms in the second results set, without executing any query other than the updated query to generate the second results set.

2. The method of claim 1, further comprising:
   generating a second updated query comprising terms that are in the list and that are weighted based on said weights;
   assigning, to each term in the second updated query that is also a term of the original query, a specified weight that is greater than weights of all other non-original query terms in the second updated query;
   generating a third results set based on executing the second updated query relative to all metadata associated with each image in said plurality of images; and
   storing the third results set on a non-volatile or volatile computer readable storage medium.

3. The method of claim 1, further comprising:
   generating a second updated query comprising terms that are in the list and that are weighted based on said weights;
   assigning, to each term in the second updated query that is also a term of the original query, a specified weight that is less than weights of all other non-original query terms in the second updated query;
   generating a third results set based on executing the second updated query relative to all metadata associated with each image in said plurality of images; and
   storing the third results set on a non-volatile or volatile computer readable storage medium.

4. A computer-implemented method to generate a results set of images, comprising:
- receiving an original query from a user to search a plurality of images, each of which is associated with metadata;
- generating a first results set based on executing the original query relative to tags from the metadata associated with each image in said plurality of images;
- selecting, from the first results set, a specified number of results ranked highest in the first results set;
- generating a list comprising terms from tags from the metadata associated with each result of the specified number of results;
- for each term in the list, calculating a weight for that term based on a quantity of separate users that tagged a same image with that term;
- generating an updated query comprising terms that are in the list and that are weighted based on said weights;
- excluding all terms of the original query from the updated query;
- after said excluding, generating a second results set based on executing the updated query relative to tags from the metadata associated with each image in said plurality of images; and
- storing the second results set on a non-volatile or volatile computer readable storage medium.

5. A computer-implemented method to generate a results set of images, comprising:
- receiving an original query from a user to search a plurality of images, each of which is associated with metadata;
- generating a first results set based on executing the original query relative to metadata associated with each image in said plurality of images;
- selecting, from the first results set, a specified number of results ranked highest in the first results set;
- generating a list comprising terms from metadata associated with each result of the specified number of results;
- for each term in the list, calculating a weight for that term based on ratings that users, excluding users that tagged an image with that term, gave to that term as an assessment of that term's appropriateness to an image;
- generating an updated query comprising terms that are in the list and that are weighted based on said weights;
- excluding all terms of the original query from the updated query;
- after said excluding, generating a second results set based on executing the updated query relative to metadata associated with each image in said plurality of images; and
- storing the second results set on a non-volatile or volatile computer readable storage medium.

6. The method of claim 5, wherein the list comprises terms from only tags, including tags that were associated with particular images by users other than users that uploaded the particular images.

7. The method of claim 5, wherein the specified number of results is based upon the number of relevant results generated by the original query.

8. The method of claim 5, wherein the specified number of results is based upon a percentage of a quantity of relevant results generated by the original query.

9. The method of claim 5, wherein metadata comprises title, description, and tags.

10. The method of claim 5, wherein the specified number of results is less than all of the results in the first results set.

11. A computer-readable storage medium carrying one or more sequences of instructions which, when executed by one or more processors, causes the one or more processors to:
- receive an original query from a user to search a plurality of images, each of which is associated with metadata;
- generate a first results set based on executing the original query relative to metadata associated with each image in said plurality of images;
- select, from the first results set, a specified number of results ranked highest in the first results set;
- generate a list comprising terms from metadata associated with each result of the specified number of results;
- for each term in the list, calculate a weight for that term based on a frequency of occurrence of that term in the list;
- generate a single updated query comprising terms that are in the list and that are weighted based on said weights;
- generate a second results set by executing only the updated query relative to metadata associated with each image in said plurality of images;
- store the second results set on a non-volatile or volatile computer readable storage medium; and
- display, as a result of the original query, only images that are associated with metadata containing terms in the second results set, without executing any query other than the updated query to generate the second results set.

12. The computer-readable storage medium of claim 11, wherein the list comprises terms from only tags, including tags that were associated with particular images by users other than users than uploaded the particular images.

13. The computer-readable storage medium of claim 11, wherein the specified number of results is based upon the number of relevant results generated by the original query.

14. The computer-readable storage medium of claim 11, wherein the specified number of results is based upon a percentage of a quantity of relevant results generated by the original query.

15. The computer-readable storage medium of claim 11, wherein metadata comprises title, description, and tags.

16. The computer-readable storage medium of claim 11, wherein the specified number of results is less than all of the results in the first results set.

* * * * *